(12) United States Patent
Ko

(10) Patent No.: US 10,595,629 B2
(45) Date of Patent: Mar. 24, 2020

(54) HEIGHT-ADJUSTABLE TABLE LEG

(71) Applicant: Wen-Shan Ko, Lugang Township, Changhua County (TW)

(72) Inventor: Wen-Shan Ko, Lugang Township, Changhua County (TW)

( * ) Notice: Subject to any disclaimer, the term of this patent is extended or adjusted under 35 U.S.C. 154(b) by 0 days.

(21) Appl. No.: 16/364,803

(22) Filed: Mar. 26, 2019

(65) Prior Publication Data

US 2020/0037753 A1    Feb. 6, 2020

(30) Foreign Application Priority Data

Aug. 6, 2018   (TW) .............................. 107127250 A

(51) Int. Cl.
*A47B 9/20*    (2006.01)
*A47B 9/10*    (2006.01)
*F16C 29/04*   (2006.01)
*F16C 33/54*   (2006.01)
*F16C 33/48*   (2006.01)
*A47B 21/02*   (2006.01)

(52) U.S. Cl.
CPC .................. *A47B 9/20* (2013.01); *A47B 9/10* (2013.01); *F16C 29/045* (2013.01); *F16C 29/048* (2013.01); *F16C 33/48* (2013.01); *F16C 33/542* (2013.01); *A47B 21/02* (2013.01); *A47B 2200/0052* (2013.01); *A47B 2200/0059* (2013.01); *F16C 2314/70* (2013.01)

(58) Field of Classification Search
CPC .. A47B 9/20; A47B 9/10; A47B 21/02; A47B 2200/0052; A47B 2200/0059
See application file for complete search history.

(56) References Cited

U.S. PATENT DOCUMENTS

| 3,521,341 | A  | * | 7/1970 | Hornlein .................. | A47B 9/20 |
|---|---|---|---|---|---|
|  |  |  |  |  | 29/898.066 |
| 9,144,301 | B2 | * | 9/2015 | Riis ......................... | A47B 9/20 |
| 9,380,866 | B1 | * | 7/2016 | Davis ....................... | A47B 9/20 |
| 9,629,452 | B1 | * | 4/2017 | Chen ........................ | A47B 9/20 |
| 10,226,119 | B1 | * | 3/2019 | Ko ............................ | A47B 9/20 |
| 2012/0043436 | A1 | * | 2/2012 | Atkinson ................. | A47B 9/20 |
|  |  |  |  |  | 248/188.5 |
| 2016/0037907 | A1 | * | 2/2016 | Ergun ...................... | A47B 9/12 |
|  |  |  |  |  | 108/147 |
| 2016/0281912 | A1 | * | 9/2016 | Christen ................ | F16M 11/26 |
| 2019/0032691 | A1 | * | 1/2019 | Lin ........................ | F16B 7/1436 |

* cited by examiner

*Primary Examiner* — Daniel J Rohrhoff
(74) *Attorney, Agent, or Firm* — Muncy, Geissler, Olds & Lowe, P.C.

(57) ABSTRACT

A table leg includes a fixed outer tube, a movable inner tube vertically movable in the fixed outer tube and having two pairs of parallel walls, and a plurality of rotating members rotatably mounted to one pair of the parallel walls of the movable inner tube and partially protruding out from an outer surface of the movable inner tube and stopped against an inner surface of the fixed outer tube, such that the rotating members are rotatable when the movable inner tube is moved relative to the fixed outer tube.

9 Claims, 6 Drawing Sheets

HEIGHT-ADJUSTABLE TABLE LEG

BACKGROUND OF THE INVENTION

1. Field of the Invention

The present invention relates to table legs, and more particularly to a height-adjustable table leg, which can solve the problem of surface wear during operation.

2. Description of the Related Art

In order to meet the needs of different users on the desktop height, commonly used reading tables, computer tables or office desks, are normally equipped with an elevation adjustment mechanism for allowing users to adjust the height of table legs as desired. Referring to a conventional table leg, it generally comprises a fixed outer tube and a movable inner tube movably inserted in the fixed outer tube. By means of adjusting the elevation of the movable inner tube relative to the fixed outer tube, the height of the table leg is thus adjusted.

However, the movable inner tube will be rubbed against the fixed outer tube, causing wear and noise problems. Thus, this related art design still has room for improvement.

SUMMARY OF THE INVENTION

The present invention has been accomplished under the circumstances in view. It is the main object of the present to provide a height-adjustable table leg, which can reduce surface wear during operation.

To attain the above objective, the present invention provides a table leg which includes a fixed outer tube, a moveable inner tube, and a plurality of rotating members. The moveable inner tube is movably inserted in the fixed outer tube and has a square cross section with two pairs of parallel walls. The rotating members are rotatably mounted to one pair of the parallel walls of the movable inner tube and partially protruding out from an outer surface of the movable inner tube and stopped against an inner surface of the fixed outer tube, such that the rotating members are rotatable when the movable inner tube is moved relative to the fixed outer tube.

It can be understood from the above illustration that when the moveable inner tube is moved upwards or downwards, the friction generated between the fixed outer tube and the moveable inner tube can be reduced by the rotation of the rotating members to solve problems related to surface wear and scratching sounds.

Preferably, the rotating member can be, but not limited to, a ball or roller; furthermore, the rotating member can be provided with a rotary shaft and two wheels disposed at two opposite ends of the rotary shaft. In structural design of the rotating member, the two wheels can be fixedly connected to the rotary shaft, such that the two wheels are rotated along with the rotary shaft during the movement of the moveable inner tube relative to the fixed outer tube; otherwise, the two wheels can be rotatably connected to the rotary shaft, such that the two wheels and the rotary shaft are rotated non-synchronously during the movement of the moveable inner tube relative to the fixed outer tube.

Preferably, a bushing is disposed in the moveable inner tube, and each of the walls of the moveable inner tube is provided with an accommodating groove each having the same shape as one rotating member. Thus, each of the rotating members is rotatably disposed in one accommodating groove of the moveable inner tube and stopped against an outer surface of the bushing.

Preferably, the bushing has a plurality of openings each corresponding to one wheel of each rotating member for reducing the friction generated between the wheels and the bushing and facilitating the rotation of the rotating members.

Preferably, a gas pressure bar can be disposed in the movable inner tube. The gas pressure bar has a retractable rod with a distal end thereof connected to a bottom plate of the fixed outer tube. Thus, when the retractable rod extends, the moveable inner tube is driven by the retractable rod to move upwards.

Other advantages and features of the present invention will be fully understood by reference to the following specification in conjunction with the accompanying drawings, in which like reference signs denote like components of structure.

DETAILED DESCRIPTION OF THE INVENTION

The invention will now be described by way of examples with reference to the annexed drawings. In the specification, the terms "upwards", "downwards", "inner", "outer", "top", "bottom" and so on are merely descriptive terms based on the normal use direction but not intended to limit the scope of the invention.

Figure 1:
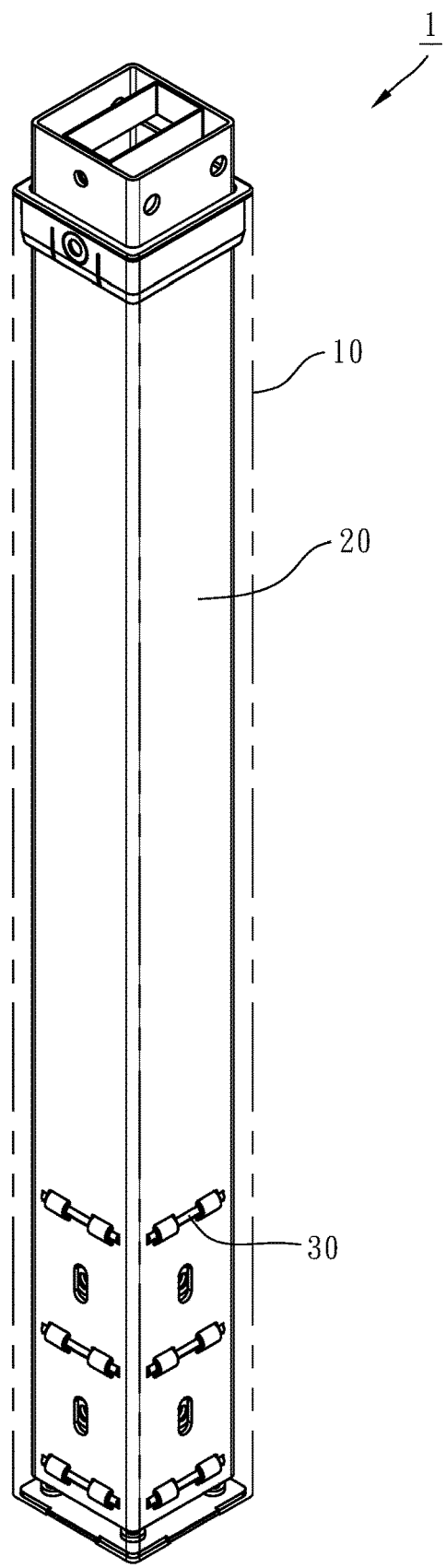
FIG. 1 is a perspective view of a table leg according to the present invention, in which a fixed outer tube is illustrated by an imaginary line.
Figure 2:
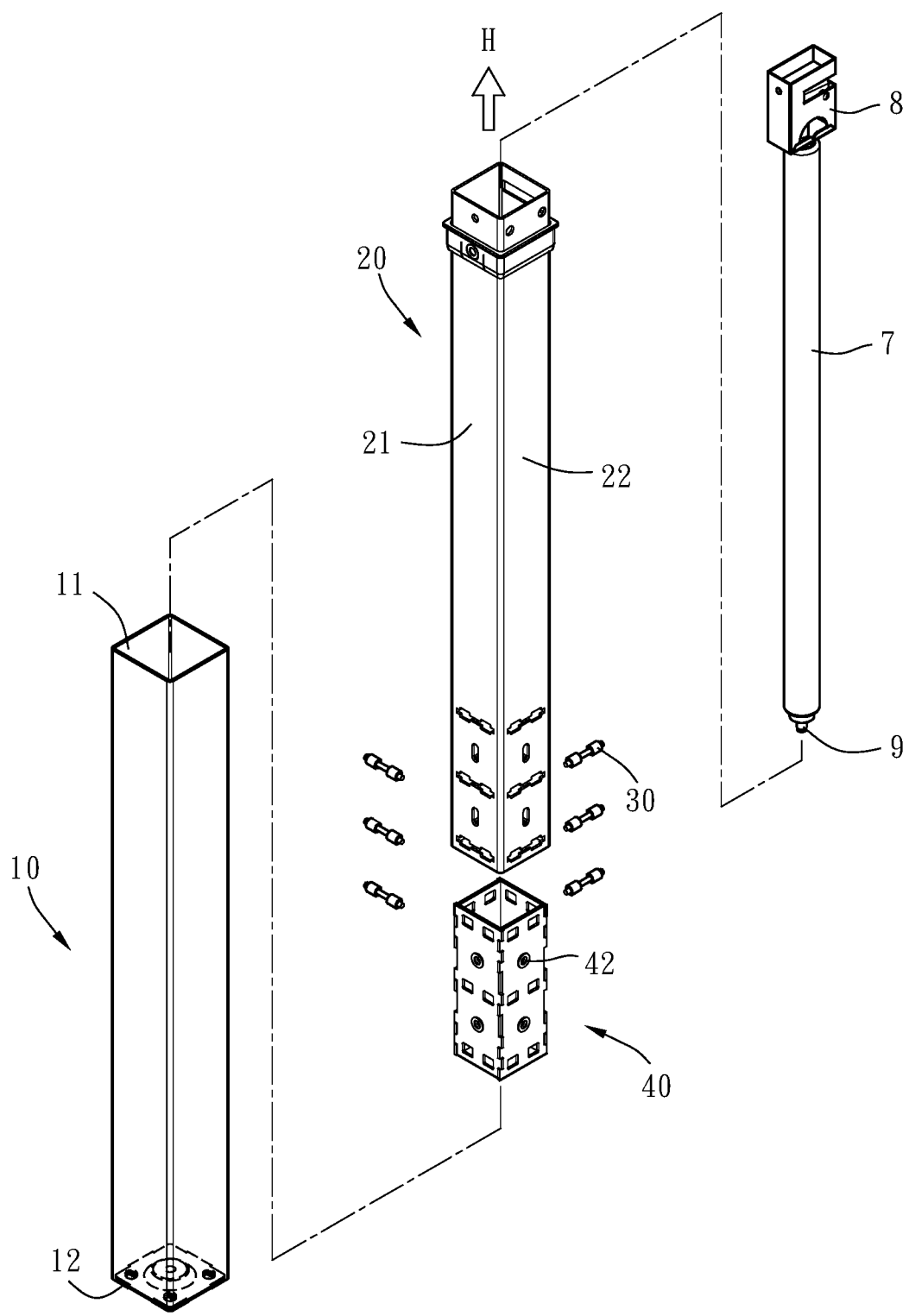
FIG. 2 is an exploded view of the table leg according to the present invention.

Referring to FIGS. 1 and 2, a table leg 1 of the present invention comprises a fixed outer tube 10, a movable inner tube 20, twelve rotating members 30, and a bushing 40.

The fixed outer tube 10 has a square cross section. The fixed outer tube 10 is provided with a top hole 11 at a top end thereof and a bottom plate 12 at a bottom end thereof.

Figure 4:
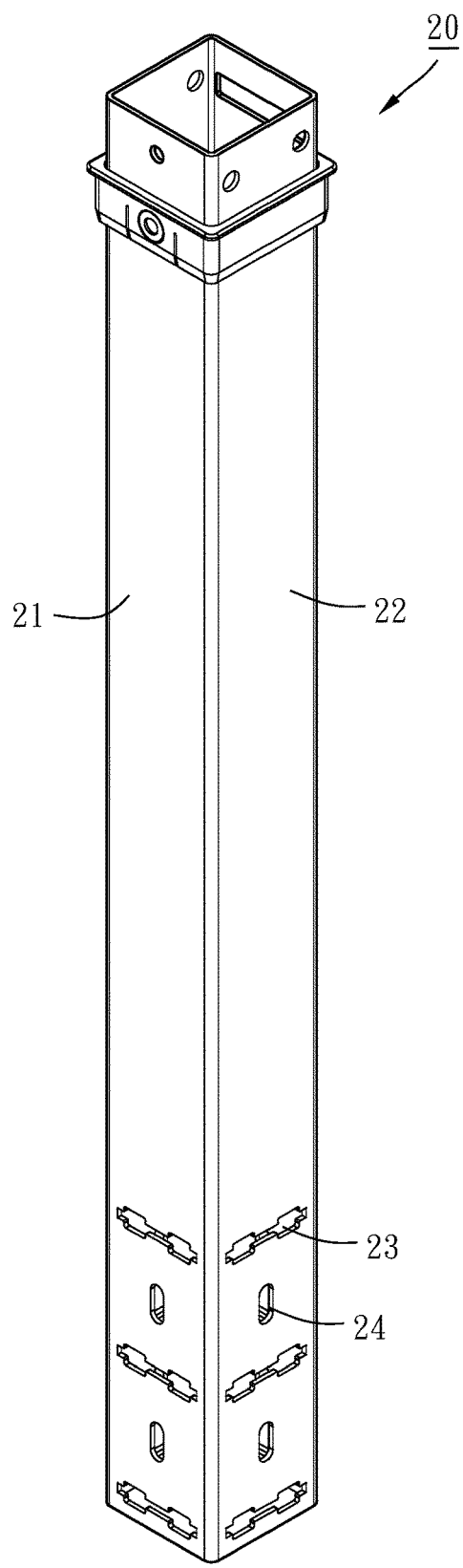
FIG. 4 is a perspective view of a moveable inner tube of the table leg according to the present invention.
Figure 6A:
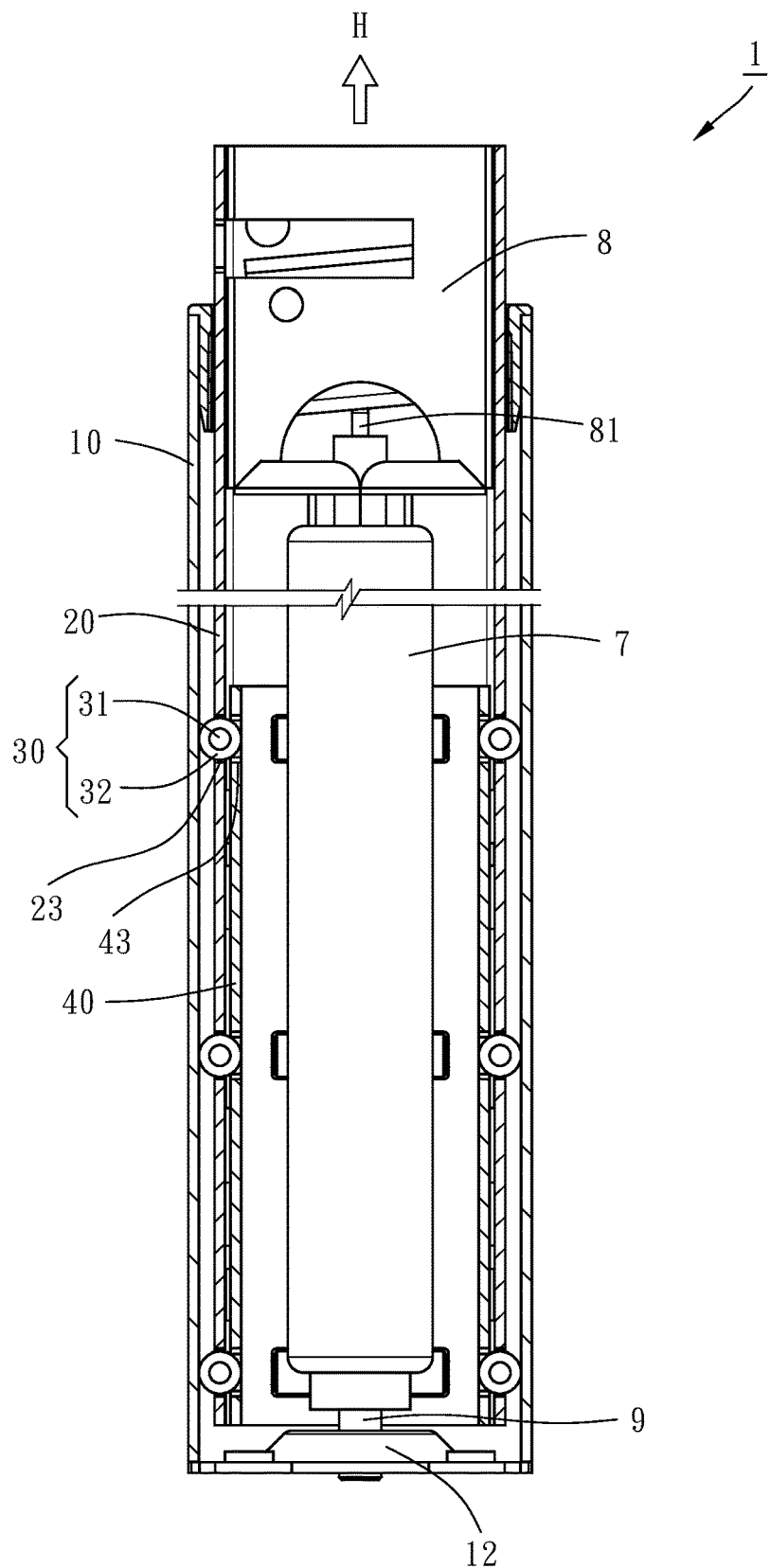
FIGS. 6A and 6B are longitudinal sectional views of the table leg in operation according to the present invention.
Figure 6B:
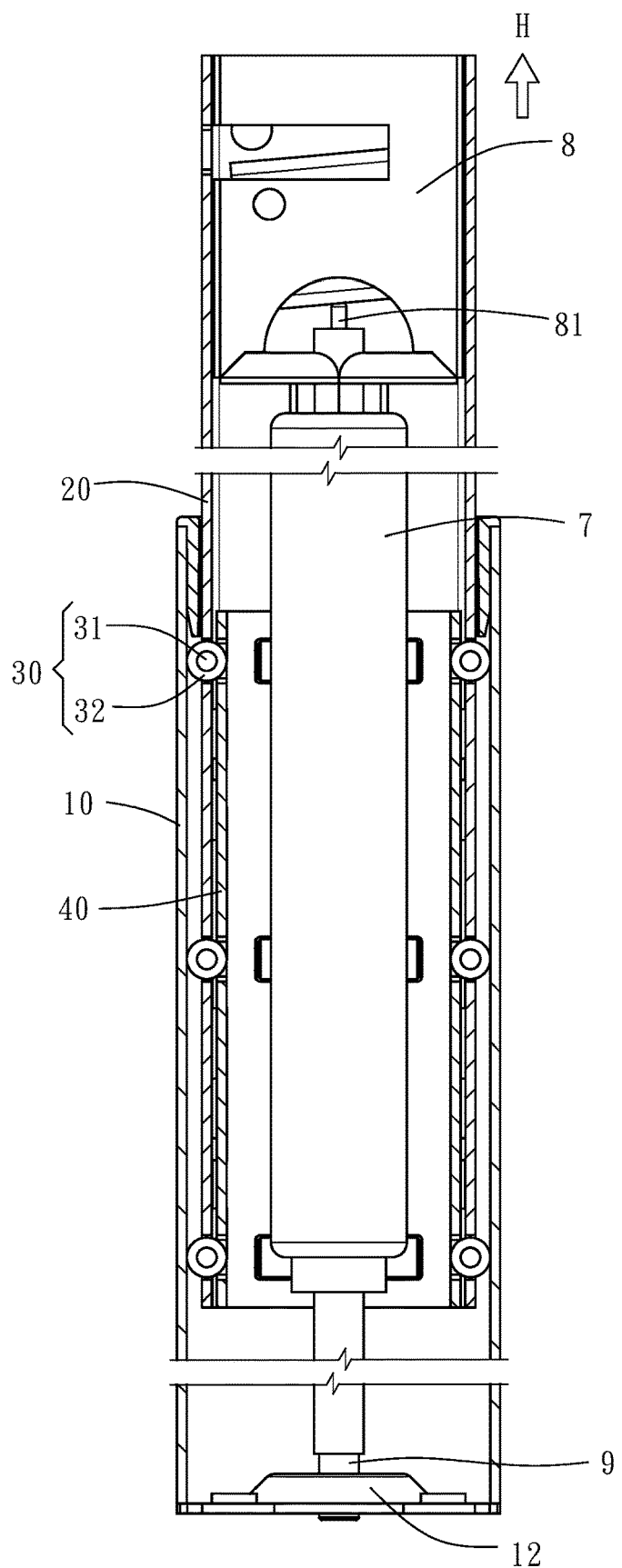

The movable inner tube 20 has a square cross section. The movable inner tube 20 is vertically and movably inserted in the fixed outer tube 20 along an axis H and provided with a top end thereof for connection of a table board (not shown). Referring to FIGS. 2 and 4, the movable inner tube 20 has two parallel first walls 21 and two parallel second walls 22. Each of the first and second walls 21 and 22 has three accommodating grooves 23 arranged in a spaced manner along the axis H, and two positioning holes 24 each located between the two adjacent accommodating grooves 23. As shown in FIGS. 2 and 6A, a gas pressure bar 7 is mounted in the movable inner tube 20, and provided with a bracket 8, a switch 81 disposed in the bracket 8, a retractable rod 9 having a distal end thereof fixedly connected to the bottom plate 12 of the fixed outer tube 10. Thus, when the switch 81 is pressed to turn on the gas pressure bar 7, the retractable rod 9 extends to drive the movable inner tube 20 to move upwards relative to the fixed outer tube 10, as shown in FIGS. 6A and 6B.

Figure 3:
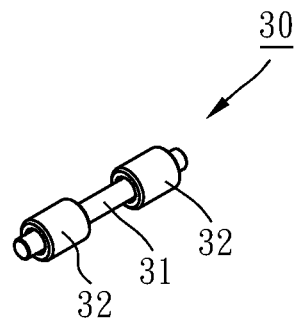
FIG. 3 is a perspective view of a rotating member of the table leg according to the present invention.

As shown in FIGS. 2 and 3, each of the rotating members 30 has the same shape as one accommodating groove 23 of the movable inner tube 20 and is rotatably disposed in one accommodating groove 23 of the movable inner tube 20. The rotating members 30 each have a rotary shaft 31 and two wheels 32. The two wheels 32 are hollow cylinders and rotatably sleeved on two opposite ends of the rotary shaft 31, that is to say, the two wheels 32 are not fixedly connected to the rotary shaft 31.

Figure 5:
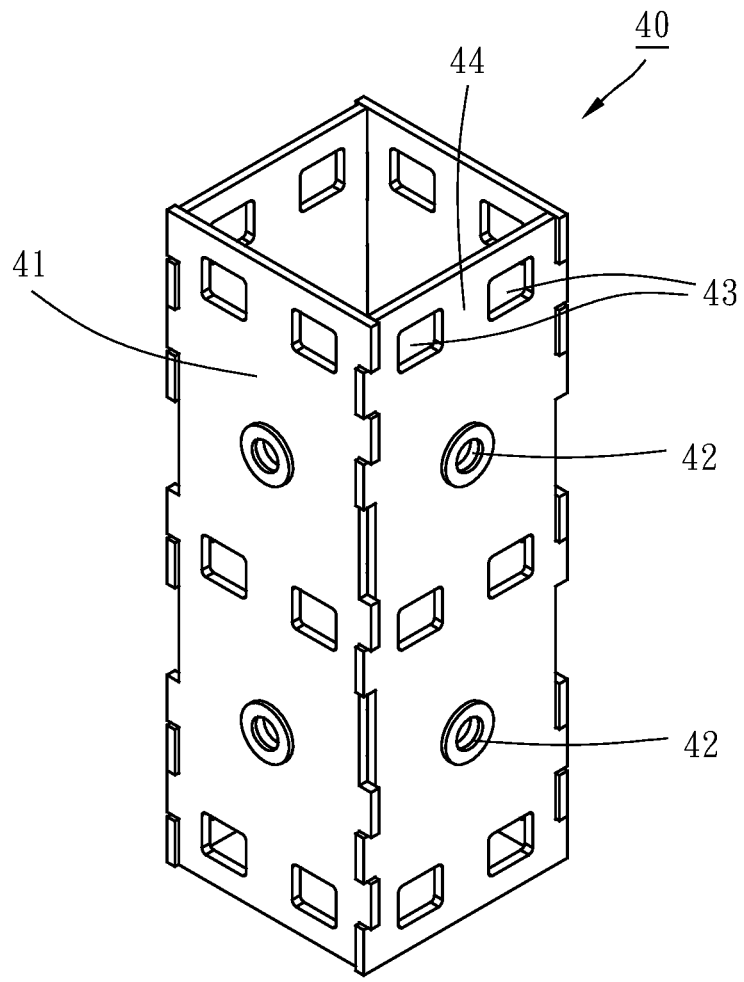
FIG. 5 is a perspective view of a bushing of the table leg according to the present invention.

As shown in FIGS. 2 and 5, the busing 40 has four plates 41 connected together to form a hollow square column and each provided two threaded holes 42 and six openings 43. The busing 40 is inserted in the movable inner tube 20 and fastened to the movable inner tube 20 by using a plurality of screws (not shown), each of which penetrates through the corresponding positioning hole 24 of the movable inner tube 20 and is screwed to the corresponding threaded hole 42 of the plate 41. As shown in FIGS. 5 and 6A, each rotary shaft 31 is stopped against the outer surface of a portion 44 of the plate 41, and each wheel 32 is received in one opening 43 of the plate 41 so as not to be stopped against the outer surface of the plate 41; furthermore, each wheel 32 partially protrudes out from the outer surface of the movable inner tube 20 and is stopped against the inner surface of the fixed outer tube 10.

It deserves mention that the bushing 40 is fastened to the movable inner tube 20 by using the screws in the present embodiment; however, the plates 41 can be welded to the inner surface of the movable inner tube 20 to firmly combine the bushing 40 with the moveable inner tube 20. Further, after the bushing 40 is assembled with the movable inner tube 20, in order to facilitate assembly of the rotating members 30, lubrication can be applied to the rotating members 30 to allow the rotating members 30 to be positioned in the accommodation grooves 23, thereby preventing the rotating members 30 from falling off the movable inner tube 20 when the movable inner tube 20 is assembled with the fixed outer tube 10.

In actual operation, when the movable inner tube 20 is not moved upwards, as shown in FIG. 6A, the rotary shafts 31 are stopped against the portions 44 of the bushing 40, and the wheels 32 are received in the openings 43 of the bushing 40 and stopped against the inner surface of the fixed outer tube 10 in a point-contact manner. When the switch 81 is pressured by a user, as shown in FIG. 6B, the retractable rod 9 extends to drive the movable inner tube 20 to move upwards relative to the fixed outer tube 10, enabling the height of the table leg 1 to be increased. During the movement of the moveable inner tube 20, the rotary shafts 31 and/or the wheels 32 of the rotating members 30 are driven to rotate, such that the friction generated between the moveable inner tube 20 and the fixed inner tube 10 can be reduced, thereby solving problems related to surface wear and scratching sounds.

What is claimed is:

1. A table leg comprising:
   a fixed outer tube;
   a movable inner tube movably inserted in the fixed outer tube and having a square cross section with two pairs of parallel walls; and
   a plurality of rotating members rotatably mounted to one pair of the parallel walls of the movable inner tube and partially protruding out from an outer surface of the movable inner tube and stopped against an inner surface of the fixed outer tube, such that the rotating members are rotatable when the movable inner tube is moved relative to the fixed outer tube,
   wherein each of the rotating members has a rotary shaft and two wheels disposed at two opposite ends of the rotary shaft.

2. The table leg as claimed in claim 1, wherein the two wheels are rotatably sleeved on the two opposite ends of the rotary shaft.

3. The table leg as claimed in claim 1, wherein the rotating members are rotatably mounted to the two pairs of the parallel walls of the movable inner tube.

4. The table leg as claimed in claim 3, wherein each of the rotating members is received in an accommodating groove of each of the parallel walls and stopped against an outer surface of a bushing disposed in the movable inner tube; each of the accommodating grooves has a same shape as one of the rotating members.

5. The table leg as claimed in claim 4, wherein the bushing has a plurality of openings each corresponding to one of the two wheels of the rotating members.

6. The table leg as claimed in claim 1, further comprising a gas pressure bar disposed in the movable inner tube and having a retractable rod with a distal end thereof connected to a bottom plate of the fixed outer tube.

7. The table leg as claimed in claim 1, wherein each of the rotating members is received in an accommodating groove of each of the parallel walls and stopped against one of four plates mounted to an inner surface of the movable inner tube; each of the accommodating grooves has a same shape as one of the rotating members.

8. A table leg comprising,
   a fixed outer tube;
   a movable inner tube movably inserted in the fixed outer tube and having a square cross section with two pairs of parallel walls; and
   a plurality of rotating members rotatably mounted to one pair of the parallel walls of the movable inner tube and partially protruding out from an outer surface of the movable inner tube and stopped against an inner surface of the fixed outer tube, such that the rotating members are rotatable when the movable inner tube is moved relative to the fixed outer tube,
   wherein each of the rotating members is received in an accommodating groove of each of the parallel walls and stopped against an outer surface of a bushing disposed in the movable inner tube; each of the accommodating grooves has a same shape as one of the rotating members.

9. The table leg as claimed in claim 8, wherein each of the rotating members is a ball or roller.

* * * * *